(No Model.)
J. J. GRAVES.
HEATING STOVE.
No. 540,587. Patented June 4, 1895.
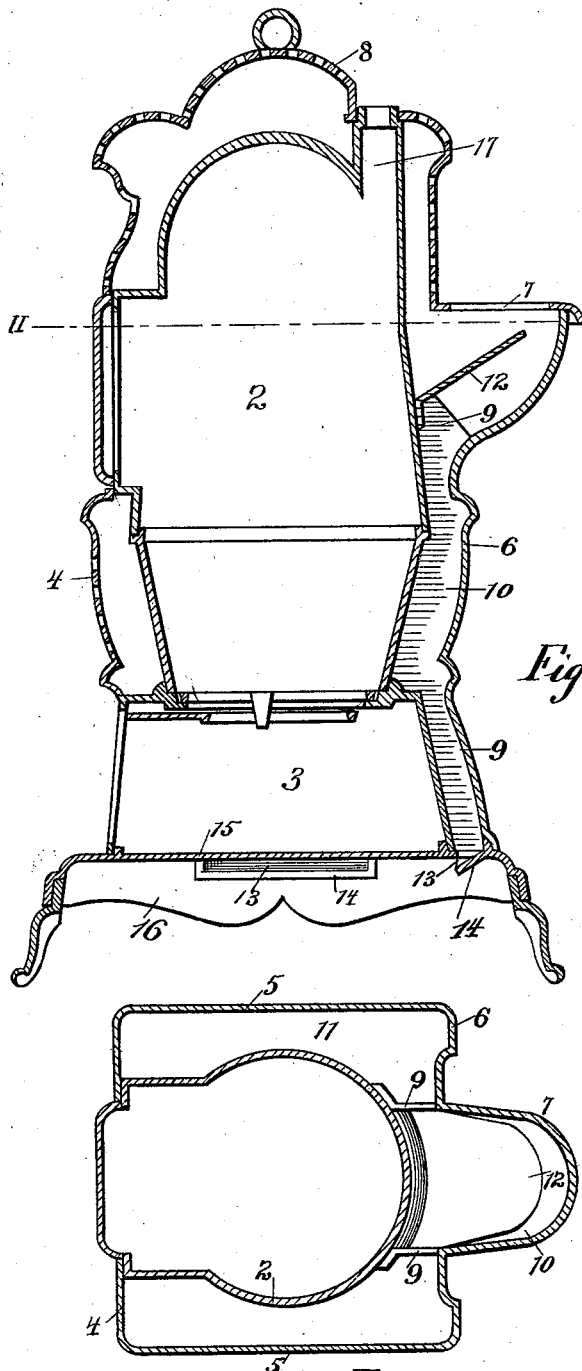
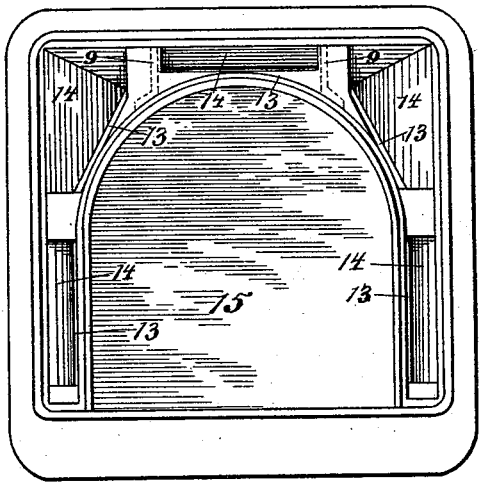
Witnesses:
Jos H Milans
J. Edwin Hutchinson
Inventor,
John J. Graves
by J. S. Barker
his Atty

UNITED STATES PATENT OFFICE.

JOHN JAY GRAVES, OF BUFFALO, NEW YORK, ASSIGNOR TO SHERMAN S. JEWETT & CO., OF SAME PLACE.

HEATING-STOVE.

SPECIFICATION forming part of Letters Patent No. 540,587, dated June 4, 1895.

Application filed March 2, 1895. Serial No. 540,363. (No model.)

*To all whom it may concern:*

Be it known that I, JOHN JAY GRAVES, a citizen of the United States, residing at Buffalo, in the county of Erie and State of New York, have invented certain new and useful Improvements in Heating-Stoves; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention has for its object to improve heating stoves in the several particulars which will be hereinafter pointed out; and it consists in a new and improved arrangement of hot air flues, or particularly one of them, and an improved construction of the base of the stove whereby the openings to the air flues are of novel disposition and arrangement.

In order that my invention may be the better understood, I have illustrated one embodiment thereof, without however wishing to be limited in the usual applications of my invention to the particular form, which, for the sake of illustration, I have delineated.

In the said drawings, Figure 1 is a vertical section of a heating-stove provided with my improvements. Fig. 2 is a horizontal section taken on the line II II, Fig. 1. Fig. 3 is a perspective view of the stove with the outer ornamental casing removed, this view being upon a somewhat smaller scale than the other views. Fig. 4 is a detached plan view of the base and bottom plate of the stove.

The stove consists essentially of two casings, the inner casing constituting the combustion chamber and the outer casing being ornamented to give a pleasing exterior appearance to the stove, and serving to inclose hot air flues which are arranged between the said outer and inner casings, and through which air is passed and heated and then discharged into the apartment in which the stove is situated.

In the drawings, 2, represents the inner casing or body of the stove, which may be of any usual or approved construction, and is shown as being supported upon the ash receptacle, 3. The outer casing is shown as being formed of a front plate, 4, side plates, 5, 5, a rear plate, 6, and a top portion, 8. These plates are suitably perforated to permit of the escape of the air which has been heated, but the arrangement of these perforations does not constitute a portion of my invention and therefore need not be described in detail.

It is desirable that a stove of the character such as I have indicated, should be so constructed that a vessel containing water may be readily heated, and to this end, I provide the outer casing at its rear side with a projection, 7, upon the top of which a vessel containing water may be placed. In order to properly direct the heated air passing upward through the flue between the outer and inner casings of the stove so that it shall be most effective in heating a vessel placed upon the top of the projection or extension, 7, I arrange a deflecting plate, 12, between these casings and a short distance below the top of the projection. This deflecting plate may be secured to one or the other of the casings, and is inclined so that the heated air has to pass in a substantially horizontal direction, directly under the top of the projection, 7, after which it escapes into the upper part of the flue between the outer and inner casings, and may then freely pass out into the apartment through the openings provided for that purpose.

I have found it desirable to combine with the deflecting plate, 12, two vertically disposed partition plates, 9, 9, which extend upward from the bottom plate, 15, of the ash pit to the said deflecting plate, and extend between the outer and the inner casings of the stove, thus constituting a rear air flue, 10, which is by these partition plates, separated from the side air flues, 11, 11, until a position above the deflecting plate, 12, is reached. It thus follows that the air which enters the lower portion of the flue, 10, through the opening, 13, in the top plate, 15, of the base is confined in the said flue until it has passed the projection or extension, 7.

It will be understood that the rear plate, 6, is imperforate from its lower end up to the top of the water heating projection or extension. This construction of the hot air flues, I have found particularly advantageous in a stove which is provided with an extension upon which it is intended a vessel containing water should be placed.

The air to be heated in the flues, 10, 11, enters at the lower ends of said flues through openings, 13, in the base plate, 15. These openings instead of being perfectly free and unobstructed have arranged opposite to them the flanges, 14, which project downward and inward so that the cold air, before it passes into the flues, is caused to impinge against the heated base plate, 15. This arrangement I have found, causes a more rapid circulation of the air through the heating flues, and thus makes the stove a more powerful heater.

The stove is shown as being supported upon a base or stand, 16, which may be of suitable height to give the stove proper elevation and is of proper construction to permit ready access of air to the openings, 13. The products of combustion from the inner fire chamber, pass off through the flue, 17.

I prefer that the top plate, 15, of the base should be flat instead of dished or depressed, and should constitute the bottom of the ash receptacle.

Having thus described my invention, what I claim, and desire to secure by Letters Patent, is—

1. In a heating stove, the combination of the inner casing constituting the combustion casing, the outer casing provided with a projection or extension adapted to support a water vessel, and a deflecting plate situated in the space between these two casings, and serving to direct the heated air past the said projection, substantially as set forth.

2. In a heating stove, the combination of the inner casing constituting the combustion chamber, the outer casing provided at the rear with an extension adapted to support a water vessel, and the partition plates situated between the said casings and extending upward from the bottom of the stove to the said extension, whereby there is formed a closed flue, opening at the top into the interior space formed by the said extension, and at the bottom communicating with the outside air, substantially as set forth.

3. In a heating stove, the combination of the inner casing, the outer casing provided at its rear with an extension or projection adapted to support a water vessel, a deflecting plate, 12, situated in the space between the said casings and serving to direct the heated air past the said projection, and the partition plates, 9, 9, arranged between the said casings and extending upward from the bottom of the stove to the said deflecting plate thereby constituting an air flue, substantially as set forth.

4. In a heating stove, the combination of the inner casing, the outer casing having the side plates, the rear plates, and the top portion, provided with openings for the escape of the heating air, the rear plate being provided with a projection or extension adapted to receive a vessel containing water, the deflecting plate, 12, adjacent to the said projection or extension, and the partition plates, 9, 9, whereby there are constituted the side flues, 11, 11, and the rear flue, 10, the said flues having openings at their bottoms, substantially as set forth.

5. A heating stove having an inner casing and an outer casing with air space between them, and an opening into such air space at the bottom of the stove, and a flange projecting downward and inward being arranged adjacent to the said opening, substantially as set forth.

In testimony whereof I affix my signature in presence of two witnesses.

JOHN JAY GRAVES.

Witnesses:
ROBT. H. MONTGOMERY,
SAMUEL S. GLASS.